United States Patent Office 3,455,888
Patented July 15, 1969

3,455,888
DIALLYL MELAMINE-MODIFIED DIAL-
LYLIC PHTHALATE PREPOLYMER
MOLDING COMPOSITION
James L. Thomas, Baltimore, Md., assignor to FMC Corporation, New York, N.Y., a corporation of Delaware
No Drawing. Filed July 7, 1967, Ser. No. 651,658
Int. Cl. C08f 29/38, 45/04, 3/60
U.S. Cl. 260—78.5                 3 Claims

ABSTRACT OF THE DISCLOSURE

This application discloses solid, granular, low-melt viscosity diallylic phthalate prepolymer molding compositions containing 5–50 parts of diallyl melamine per 100 parts of diallylic phthalate prepolymer.

BACKGROUND OF THE INVENTION

Field of the invention

Diallylic phthalate molding compounds.

Description of the prior art

Diallylic phthalate molding compounds are generally not suited for encapsulating pressure-sensitive devices because of the high-melt viscosity of the diallyl phthalate resins which limits flow of the resin under molding conditions. Diallyl phthalate compounds are used for some encapsulating purposes, however, the applications are limited to non-pressure sensitive devices. These compounds exhibit long flow which is achieved through the use of cure inhibitors and do not have low-melt viscosities.

Diallyl phthalate resins are desired for use in pressure encapsulating moldings because of their superior electrical properties. Unfortunately, with or without filler diallyl phthalate resins do not exhibit a sharp drop in melt viscosity when heated to their curing temperatures of 250–300° F. For this reason, other thermosetting resins, epoxy resins in particular, which show a marked viscosity drop under the heat and pressure that are used in transfer mold encapsulation of electronic parts.

Attempts have been made to reduce the melt viscosity of diallyl phthalate molding compositions by incorporating into the resin composition liquid monomers and semi-solid uncut polyester resins to reduce the melt viscosity of the diallyl phthalate resin. These monomers and uncut semi-solid polyester resins reduce the melt viscosity of diallyl phthalate resin compositions somewhat but unfortunately, the amount of additive is limited due to caking and blocking of the molding compound during storage making the material unuseful for commercial molding operations.

SUMMARY OF THE INVENTION

I have now discovered solid, granular, low-melt viscosity thermosetting diallylic phthalate prepolymer molding compositions suitable for encapsulation molding comprising (a) 100 parts by weight of a diallylic phthalate prepolymer selected from the group consisting of diallyl orthophthalate and diallyl isophthalate prepolymers, (b) 5–55 parts by weight diallyl melamine, and (c) a catalytic amount of a free radical initiator to convert the molding compositions to the thermoset state at elevated temperatures. Quite surprisingly, diallyl melamine, a solid monomer, reduces the melt viscosity of diallyl isophthalate prepolymer molding compounds to a low viscosity under heat and pressure such that the compounds will transfer mold through pin gating and flow around electronic devices without moving or distorting the devices in the mold as well as not exerting excessive pressure on the part. A diallylic phthalate monomer, at up to 15 parts of monomer per 100 parts of diallylic phthalate prepolymer, may also be included in these molding compositions. Inert mineral and fibrous fillers may be included up to about 100 parts by weight per 100 parts of prepolymer.

DESCRIPTION OF THE INVENTION AND THE PREFERRED EMBODIMENTS

The diallylic phthalate prepolymers, diallyl orthophthalate and diallyl isophthalate, used in this invention are manufactured in a conventional fashion by polymerizing a monomeric material to produce a solution of soluble polymer in monomer, to a point short of gelation, which occurs when the molecular weight of the polymer reaches a point where it becomes insoluble in the monomer. These polymer monomer solutions (called "dopes") are then separated into a solvent soluble prepolymer fraction, and monomer. This may be done by treatment with a solvent which dissolves the monomer while precipitating the polymer, or by other means which will leave a soluble prepolymer substantially free of monomer. A typical method of separating such polymers is described by Williard in U.S. Patent 3,030,341 issued Apr. 17, 1962. These prepolymers are solids containing little or no monomers; they can be stored indefinitely in this form, since they require a catalyst and either heat or actiniclight to convert them to the insoluble stage.

Diallyl melamine is a solid reactive monomer with a melting point of 142° C. Diallyl melamine is compatible with diallyl isophthalate resins and was found to substantially reduce the melt viscosity of diallyl isophthalate at the molding temperature. Diallyl melamine has the added advantage of being solid at room temperature, thus not contributing towards caking or blocking of the molding compound.

A wide variety of water insoluble, inert inorganic fillers may be used in these molding compositions. Fillers which can be used in practicing this invention include calcium carbonate, both precipitated and wet ground types, calcium silicate, ground silica, calcined clays, chalk, limestone, calcium sulfate (anhydrous), barium sulfate, asbestos, glass (powdered), quartz, aluminum trihydrate, aluminum oxide, antimony oxide, inert iron oxides, and ground stone such as granite, basalt, marble, limestone, sandstone, phosphate rock, travertine, onyx and bauxite. Additionally, inert fibrous materials may be used such as synthetic fibers, glass fibers, asbestos and cellulosic fibers.

The polymer system should also contain a catalytic amount of an organic peroxide to catalyze the final cure of the resin. There is no advantage in using more than about 5% by weight of peroxide, based on the polymer system, while at least about 0.5% is required for complete cure. Preferably, the peroxide is present in an amount of about 2–3%. Useful peroxides include diacyl peroxides such as benzoyl peroxide, p-chlorobenzoyl peroxide, 2,4-di-chlorobenzoyl peroxide, lauroyl peroxide, and succinic acid peroxide, dialkyl peroxides such as dicumyl peroxide and di-tert.-butyl peroxide, ketone and aldehyde peroxides such as methyl ethyl ketone peroxide, cyclohexanone peroxide and hydroxyheptyl peroxide, hydroperoxides such as tert.-butyl hydroperoxide, p-methane hydroperoxide, pinane hydroperoxide, cumene hydroperoxide and 2,5 - di - methylhexane-2,5-dihydroperoxide, peroxy esters such as tert.-butyl perbenzoate, 2,5-dimethylhexane-2,5 - di(peroxybenzoate), di - tert. - butyl diperphthalate, tert.-butyl peracetate, tert.-butyl peroxyisobutyrate and isopropyl percarbonate, as well as many other organic peroxides which have been described in the literature.

These molding compositions can be prepared by any of the methods used to prepare commercial diallyl phthalate molding compositions. The compositions can be prepared in suitable mixers, by roll mill techniques, by ball milling, etc.

These compositions can be transfer molded, at the temperatures and pressures conventionally used for the transfer molding of diallyl phthalate molding compounds and epoxy molding compounds used for transfer encapsulation molding. Typical transfer molding is done at about 280 to 350° F. and about 50 to 2000 p.s.i.

The melt viscosity of the molding compositions of this invention were determined on a Brabender Plasticorder at 121° and 142° C. using a shear speed of 33 r.p.m. A composition containing about 34 parts of diallyl melamine/ 100 parts of diallyl isophthalate with tertiary butyl perbenzoate as a catalyst and a small amount of hydroquinone inhibitor and a melt viscosity at 142° C. of 145 meter/grams.

The following examples are given as typical of my invention without being limited thereof. In the examples, all parts are by weight.

Example 1

Three hundred sixty seven parts of diallyl isophthalate prepolymer, 15 parts of tertiary butylperbenzoate, 125 parts of diallyl melamine, 0.5 part of hydroquinone, 8 parts of diallyl isophthalate monomer, and 10 parts of calcium stearate were added to 500 parts of acetone and in a heavy-duty mixer. The ingredients were mixed until the diallyl isophthalate prepolymer appeared to be dissolved, then 500 parts of ¼″ glass fiber was added and mixing continued until the glass was well saturated. The resin mix was removed from the mixer and dried overnight at room temperature. After drying overnight at room temperature, the compound was placed on a differential speed compounding two-roll mill and milled at 150° F. into a mill sheet. The mill sheet was ground into a granulated molding composition.

The melt viscosity of the granular molding compound was determined in the Bradender Plasticorder at 121° and 142° C. using a shear speed of 33 r.p.m. and found to have melt viscosities of 400 and 145 meter/grams respectively. The commercial epoxy resin encapsulating molding compound when tested in the Bradender Plasticorder at 142° C. and 33 r.p.m. gave a melt viscosity reading of 210 meter/grams.

The molding compound was used to prepare cured moldings which were tested and found to have the following physical properties:

| | |
|---|---|
| Heat deflection temp., ° C. | 247 |
| Flexural strength, p.s.i. | 13,700 |
| Flexural modulus×$10^6$, p.s.i. | 1.8 |
| Percent water adsorption | 0.34 |
| Dielectric constant $10^3/10^6$ | 4.2/4.1 |
| Dielectric constant $10^3/10^6$ (wet) | 4.3/4.2 |
| Dissipation factor $10^3/10^6$ | 0.005/0.004 |
| Dissipation factor $10^3/10^6$ (wet) | 0.008/0.004 |

Example 2

Diallyl orthophthalate prepolymer was compounded into molding compounds according to the procedure set forth in Example 1. The molding compounds were used to prepare cured moldings which were tested to determine their physical properties. The proportions of ingredients and the test data obtained are set forth in the following table.

TABLE

| Ingredients | Parts by weight | |
|---|---|---|
| | A | B |
| Diallyl orthophthalate prepolymer | 800 | 775 |
| Diallyl melamine | 150 | 150 |
| T-butyl perbenzoate | 30 | 30 |
| Calcium stearate | 20 | 20 |
| ¼″ glass fibers | 1000 | 1000 |
| Diallyl phthalate monomer | 50 | 75 |
| Brabender Plasticorder, meter/grams at 142° | 100 | 120 |
| Heat deflection temp., ° C | 130 | 124 |
| Izod impact strength | 1.2 | 1.2 |
| Flexural strength, p.s.i. | 17,100 | 15,000 |
| Modulus ×$10^6$, p.s.i. | 1.9 | 1.9 |
| Percent water adsorption | 0.27 | 0.26 |
| Specific gravity | 1.68 | 1.69 |
| Dielectric constant $10^3/10^6$ | 4.3/4.3 | 4.4/4.3 |
| Dielectric constant $10^3/10^6$ (wet) | 4.4/4.3 | 4.4/4.3 |
| Dissipation factor $10^3/10^6$ | .006/.006 | .006/.006 |
| Dissipation factor $10^3/10^6$ (wet) | .008/.007 | .008/.007 |
| Rockwell hardness (M scale) | 113 | 113 |

As will be apparent to those skilled in the art, numerous modifications and variations of the embodiments illustrated above may be made without departing from the spirit of the invention or the scope of the following claim.

What is claimed is:

1. A diallylic phthalate molding composition comprising (a) 100 parts by weight of a diallylic phthalate prepolymer, selected from the group consisting of diallyl orthophthalate prepolymer and diallyl isophthalate prepolymer, (b) 5–50 parts by weight of diallyl melamine, and (c) a catalytic amount of a free radical initiator to convert the molding composition to the thermoset state at elevated temperatures.

2. The diallylic phthalate molding composition of claim 1 further comprising up to 100 parts by weight per 100 parts of diallylic phthalate prepolymer of a filler selected from the group consisting of inert mineral fillers and inert fibrous fillers.

3. The composition of claim 1 further comprising up to 15 parts by weight per 100 parts of prepolymer of a monomer selected from the group consisting of diallyl orthophthalate monomer and diallyl isophthalate monomer.

References Cited

UNITED STATES PATENTS 3,113,123   12/1963   Heiberger et al. __ 260—78.5 XR

FOREIGN PATENTS 894,239   4/1962   Great Britain.

JOSEPH L. SCHOFER, Primary Examiner

JOHN KIGHT, Assistant Examiner

U.S. Cl. X.R.

106—38.2; 260—41